United States Patent
Johnson et al.

(10) Patent No.: US 7,852,222 B2
(45) Date of Patent: *Dec. 14, 2010

(54) METHOD AND SYSTEM OF ASSET IDENTIFICATION AND TRACKING FOR ENTERPRISE ASSET MANAGEMENT

(75) Inventors: Daniel T. Johnson, Medina, MN (US); Robert S. McConnell, Shakopee, MN (US)

(73) Assignee: Verisae, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/277,171

(22) Filed: Nov. 24, 2008

(65) Prior Publication Data

US 2009/0072977 A1    Mar. 19, 2009

Related U.S. Application Data

(63) Continuation of application No. 11/431,147, filed on May 9, 2006, now Pat. No. 7,474,218, which is a continuation-in-part of application No. 10/768,957, filed on Jan. 30, 2004, now Pat. No. 7,062,389, which is a continuation-in-part of application No. 09/883,779, filed on Jun. 18, 2001, now Pat. No. 7,496,532, said application No. 11/431,147 is a continuation-in-part of application No. 10/429,619, filed on May 5, 2003, now Pat. No. 7,512,523, and a continuation-in-part of application No. 10/734,725, filed on Dec. 12, 2003, now abandoned, and a continuation-in-part of application No. 10/771,090, filed on Feb. 3, 2004, now abandoned, and a continuation-in-part of application No. 10/922,364, filed on Aug. 20, 2004, now abandoned.

(60) Provisional application No. 60/444,091, filed on Jan. 31, 2003, provisional application No. 60/212,234, filed on Jun. 16, 2000, provisional application No. 60/288,827, filed on May 5, 2001, provisional application No. 60/432,120, filed on Dec. 9, 2002, provisional application No. 60/433,179, filed on Dec. 13, 2002, provisional application No. 60/444,437, filed on Feb. 3, 2003, provisional application No. 60/496,432, filed on Aug. 20, 2003.

(51) Int. Cl.
*G08B 13/14* (2006.01)
(52) U.S. Cl. ............... 340/572.4; 340/5.61; 340/10.51
(58) Field of Classification Search ............ 340/572.4, 340/572.1, 573.1, 679, 5.2, 5.61, 10.1, 10.51, 340/825.49; 705/8–11, 28
See application file for complete search history.

(56) References Cited

U.S. PATENT DOCUMENTS 4,612,620 A    9/1986   Davis et al.

(Continued)

FOREIGN PATENT DOCUMENTS

EP    1566875    8/2005

(Continued)

OTHER PUBLICATIONS

Office Action in related case U.S. Appl. No. 09/883,779, dated Jan. 27, 2005, 8 pp.

(Continued)

*Primary Examiner*—Thomas J Mullen
(74) *Attorney, Agent, or Firm*—Faegre & Benson, LLP

(57) ABSTRACT

A system and method for managing enterprise assets located at geographically distributed sites utilizing wireless tag technologies. The method includes storing in a database information relating to each asset, wherein the stored information includes cost of each asset and cost of service for each asset. The method further includes tracking and storing information relating to servicing of the assets, including the cost of servicing. Information relating to the assets is then displayed to a user of the system.

20 Claims, 9 Drawing Sheets

U.S. PATENT DOCUMENTS

| | | |
|---|---|---|
| 4,688,026 A | 8/1987 | Scribner et al. |
| 4,755,957 A | 7/1988 | White et al. |
| 4,989,141 A | 1/1991 | Lyons et al. |
| 5,079,930 A | 1/1992 | Beaverson et al. |
| 5,198,774 A | 3/1993 | Williams, II et al. |
| 5,231,841 A | 8/1993 | McClelland et al. |
| 5,434,775 A | 7/1995 | Sims et al. |
| 5,537,313 A | 7/1996 | Pirelli |
| 5,572,438 A | 11/1996 | Ehlers et al. |
| 5,629,687 A | 5/1997 | Sutton et al. |
| 5,732,401 A | 3/1998 | Conway |
| 5,748,956 A | 5/1998 | Lafer et al. |
| 5,752,244 A | 5/1998 | Rose et al. |
| 5,758,126 A | 5/1998 | Daniels |
| 5,821,937 A | 10/1998 | Tonelli et al. |
| 5,831,610 A | 11/1998 | Tonelli et al. |
| 5,845,265 A | 12/1998 | Woolston |
| 5,859,778 A | 1/1999 | Kuroda et al. |
| 5,860,286 A | 1/1999 | Tulpule |
| 5,910,776 A | 6/1999 | Black |
| 5,918,207 A | 6/1999 | McGovern et al. |
| 5,923,850 A | 7/1999 | Barroux |
| 5,946,662 A | 8/1999 | Ettl et al. |
| 5,956,658 A | 9/1999 | McMahon |
| 5,980,090 A | 11/1999 | Royal, Jr. |
| 5,987,903 A | 11/1999 | Bathla |
| 5,996,889 A | 12/1999 | Fuchs et al. |
| 6,088,796 A | 7/2000 | Cianfrocca et al. |
| 4,688,026 A | 8/1987 | Scribner et al. |
| 4,755,957 A | 7/1988 | White et al. |
| 4,989,141 A | 1/1991 | Lyons et al. |
| 5,079,930 A | 1/1992 | Beaverson et al. |
| 5,198,774 A | 3/1993 | Williams, II et al. |
| 5,231,841 A | 8/1993 | McClelland et al. |
| 5,434,775 A | 7/1995 | Sims et al. |
| 5,537,313 A | 7/1996 | Pirelli |
| 5,572,438 A | 11/1996 | Ehlers et al. |
| 5,629,687 A | 5/1997 | Sutton et al. |
| 5,732,401 A | 3/1998 | Conway |
| 5,748,956 A | 5/1998 | Lafer et al. |
| 5,752,244 A | 5/1998 | Rose et al. |
| 5,758,126 A | 5/1998 | Daniels |
| 5,821,937 A | 10/1998 | Tonelli et al. |
| 5,831,610 A | 11/1998 | Tonelli et al. |
| 5,845,265 A | 12/1998 | Woolston |
| 5,859,778 A | 1/1999 | Kuroda et al. |
| 5,860,286 A | 1/1999 | Tulpule |
| 5,910,776 A | 6/1999 | Black |
| 5,918,207 A | 6/1999 | McGovern et al. |
| 5,923,850 A | 7/1999 | Barroux |
| 5,946,662 A | 8/1999 | Ettl et al. |
| 5,956,658 A | 9/1999 | McMahon |
| 5,980,090 A | 11/1999 | Royal, Jr. |
| 5,987,903 A | 11/1999 | Bathla |
| 5,996,889 A | 12/1999 | Fuchs et al. |
| 6,088,796 A | 7/2000 | Cianfrocca et al. |
| 6,128,602 A | 10/2000 | Northington et al. |
| 6,154,738 A | 11/2000 | Call |
| 6,169,979 B1 | 1/2001 | Johnson |
| 6,211,782 B1 | 4/2001 | Sandelman et al. |
| 6,237,020 B1 | 5/2001 | Leymann et al. |
| 6,293,114 B1 | 9/2001 | Kamemoto |
| 6,298,333 B1 | 10/2001 | Manzi et al. |
| 6,385,510 B1 | 5/2002 | Hoog et al. |
| 6,430,542 B1 | 8/2002 | Moran |
| 6,437,692 B1 | 8/2002 | Petite et al. |
| 6,460,082 B1 | 10/2002 | Lumelsky et al. |
| 6,650,346 B1 | 11/2003 | Jaeger et al. |
| 6,892,546 B2 | 5/2005 | Singh et al. |
| 6,952,680 B1 | 10/2005 | Melby et al. |
| 7,032,241 B1 | 4/2006 | Venkatachary et al. |
| 7,062,389 B2 | 6/2006 | Johnson et al. |
| 7,062,446 B1 | 6/2006 | Suhy, Jr. et al. |
| 7,124,059 B2 | 10/2006 | Wetzer et al. |
| 7,142,949 B2 | 11/2006 | Brewster et al. |
| 7,149,701 B2 | 12/2006 | McKinney |
| 7,196,621 B2 | 3/2007 | Kochis |
| 7,259,675 B2 | 8/2007 | Baker et al. |
| 7,304,573 B2 | 12/2007 | Postma |
| 7,333,880 B2 | 2/2008 | Brewster et al. |
| 7,369,968 B2 | 5/2008 | Johnson et al. |
| 7,440,871 B2 | 10/2008 | McConnell et al. |
| 7,496,532 B2 | 2/2009 | Johnson et al. |
| 7,647,207 B2 | 1/2010 | McConnell et al. |
| 2001/0047383 A1 | 11/2001 | Dutta |
| 2002/0059364 A1 | 5/2002 | Coulthard et al. |
| 2002/0070971 A1 | 6/2002 | Brown et al. |
| 2002/1383861 | 9/2002 | Sy-Yuan |
| 2003/0069743 A1 | 4/2003 | Nordrum |
| 2003/0154141 A1 | 8/2003 | Capazario et al. |
| 2004/0019511 A1 | 1/2004 | McKinney |
| 2004/0024662 A1 | 2/2004 | Gray et al. |
| 2004/0078306 A1 | 4/2004 | Whiteley et al. |
| 2004/0095237 A1 | 5/2004 | Chen et al. |
| 2004/0111697 A1 | 6/2004 | Johnson et al. |
| 2004/0162642 A1 | 8/2004 | Gasper et al. |
| 2004/0193449 A1 | 9/2004 | Wildman et al. |
| 2004/0225676 A1 | 11/2004 | Johnson et al. |
| 2004/0249515 A1 | 12/2004 | Johnson et al. |
| 2005/0021710 A1 | 1/2005 | Johnson et al. |
| 2005/0086163 A1 | 4/2005 | Johnson et al. |
| 2005/0109829 A1 | 5/2005 | Postma |
| 2005/0154669 A1 | 7/2005 | Streetman |
| 2005/0205658 A1 | 9/2005 | Baker et al. |
| 2005/0248454 A1 | 11/2005 | Hanson et al. |
| 2006/0142961 A1 | 6/2006 | Johnson et al. |
| 2006/0161450 A1 | 7/2006 | Carey et al. |
| 2006/0170889 A1 | 8/2006 | Honda |
| 2006/0187026 A1 | 8/2006 | Kochis |
| 2006/0256308 A1 | 11/2006 | Honda |
| 2007/0010914 A1 | 1/2007 | Johnson et al. |
| 2007/0043538 A1 | 2/2007 | Johnson et al. |
| 2007/0096899 A1 | 5/2007 | Johnson et al. |
| 2007/0260405 A1 | 11/2007 | McConnell et al. |
| 2007/0268138 A1 | 11/2007 | Chung et al. |
| 2008/0243687 A1 | 10/2008 | Johnson et al. |
| 2008/0255899 A1 | 10/2008 | McConnell et al. |
| 2009/0188840 A1 | 1/2009 | McConnell et al. |
| 2009/0119305 A1 | 5/2009 | Johnson et al. |
| 2009/0126388 A1 | 5/2009 | Johnson et al. |
| 2009/0132176 A1 | 5/2009 | McConnell et al. |
| 2009/0171975 A1 | 7/2009 | McConnell et al. |
| 2010/0070404 A1 | 3/2010 | Mcconnell et al. |
| 2010/0070423 A1 | 3/2010 | Mcconnell et al. |
| 2010/0121770 A1 | 5/2010 | Johnson |
| 2010/0138190 A1 | 6/2010 | Mcconnell et al. |

FOREIGN PATENT DOCUMENTS

| | | |
|---|---|---|
| JP | 10340846 | 12/1998 |
| JP | 2004-301825 | 10/2004 |
| WO | WO 9941717 | 2/1998 |
| WO | WO 9966436 | 12/1999 |
| WO | WO 0017984 | 3/2000 |
| WO | 01/73612 | 10/2001 |
| WO | WO 0197146 | 12/2001 |
| WO | WO 0207365 | 1/2002 |
| WO | WO 02090914 | 11/2002 |
| WO | WO 2005048328 | 5/2005 |

| | | |
|---|---|---|
| WO | WO 2005062351 | 7/2005 |

OTHER PUBLICATIONS

Applicant Response to Office Action dated Jan. 27, 2005, in related case U.S. Appl. No. 09/883,779, filed Jul. 1, 2005, 31 pp.
Office Action in related case U.S. Appl. No. 09/883,779, dated Sep. 26, 2005, 7 pp.
Applicant Response to Office Action dated Sep. 26, 2005, in related case U.S. Appl. No. 09/883,779, filed Dec. 27, 2005, 9 pp.
Office Action in related case U.S. Appl. No. 09/883,779, dated Feb. 10, 2006, 14 pp.
Applicant Response to Office Action dated Feb. 10, 2006, in related case U.S. Appl. No. 09/883,779, filed May 12, 2006, 16 pp.
Office Action in related case U.S. Appl. No. 09/883,779, dated Jul. 17, 2006, 18 pp.
Applicant Response to Office Action dated Jul. 17, 2006, in related case U.S. Appl. No. 09/883,779, filed Oct. 27, 2006, 11 pp.
Office Action in related case U.S. Appl. No. 09/883,779, dated Dec. 14, 2006, 18 pp.
Applicant Response to Office Action dated Dec. 14, 2006, in related case U.S. Appl. No. 09/883,779, filed Apr. 16, 2007, 31 pp.
Advisory Action in related case U.S. Appl. No. 09/883,779, dated May 25, 2007, 4 pp.
RCE filed in related case U.S. Appl. No. 09/883,779, in response to May 25, 2007 Advisory Action, filed May 30, 2007, 7 pp.
Office Action in related case U.S. Appl. No. 09/883,779 dated Jul. 5, 2007, 13 pp.
Applicant Response to Office Action dated Jul. 5, 2007, in related case U.S. Appl. No. 09/883,779, filed Jan. 4, 2008, 14 pp.
Office Action in related case U.S. Appl. No. 09/883,779, dated Apr. 23, 2008, 20 pp.
Applicant Response to Office Action dated Apr. 23, 2008, in related case U.S. Appl. No. 09/883,779, filed Aug. 27, 2008, 19 pp.
Examiner Interview Summary from related case U.S. Appl. No. 09/883,779, dated Aug. 29, 2008, 2 pp.
Office Action in related case U.S. Appl. No. 11/431,147, dated May 9, 2008, 8 pp.
Applicant Response to May 9, 2008, Office Action, in related case U.S. Appl. No. 11/431,147, filed Aug. 11, 2008, 62 pp.
Office Action in related case U.S. Appl. No. 10/768,957, dated Jun. 30, 2005, 5 pp.
Applicant Response to Jun. 30, 2005, Office Action, in related case U.S. Appl. No. 10/768,957, filed Oct. 27, 2005; recorded Oct. 31, 2005, 11 pp.
Office Action in related case U.S. Appl. No. 11/357,330, dated Nov. 17, 2006, 6 pp.
Office Action in related case U.S. Appl. No. 11/423,860, dated Jun. 18, 2007, 6 pp.
Applicant Response to Jun. 18, 2007, Office Action, in related case U.S. Appl. No. 11/423,860, filed Nov. 21, 2007, 18 pp.
Australian Application No. 20003296444 Examination Report dated Jun. 24, 2008, 3 pp.
International Search Report and Written Opinion from related case PCT/US07/68420, mailed Sep. 29, 2008, 10 pp.
European Office Action in related case 04781780.4-2221 dated May 12, 2006, 2 pp.
European Office Action in related case 04781780.4-2221, dated Nov. 20, 2006, 2 pp.
Response to European Patent Office Action in related case 04781780.4-2221, dated May 25, 2007, 13 pp.
Response to Written Opinion of Jun. 11, 2002, from PCT/US01/19491, mailed Aug. 12, 2002, 12 pp.
International Search Report and Written Opinion from international application No. PCT/US04/03008, mailed Sep. 15, 2005, 9 pp.
International Preliminary Report on Patentability from related case PCT/US04/27165, mailed Mar. 2, 2006, 8 pp.
European Office Action from European application No. 03796979.7, dated Apr. 14, 2008, 6 pp.
International Search Report and Written Opinion for related case PCT/US08/55938, mailed Nov. 21, 2008, 10 pp.

"The Greenhouse Gas Protocol: A Corporate Accounting and Reporting Standard," World Resources Institute, 116 pp., Published Mar. 2004.
Dilger, "Asset Management, maintenance redefined," Manufacturing Systems 15(7): 122-128, Jul. 1997.
"Equipment Containing Ozone Depleting Substances at Industrial Bakeries," EPA, Federal Register, Feb. 2002: 67(2) 5586-5595.
Pays, "An Intermediation and Payment System Technology," Fifth International World Wide Web Conference, May 6-10, Paris, France, 1996, 12 pp.
"Compliance Guidance for Industrial Process Refrigeration Leak Repair Regulations Under Section 608 of the Clean Air Act," Oct. 1995, The Chemical Manufacturer's Association and the Environmental Protection Agency, 29 pp.
Extended European Search Report from European patent application No. 07252399.6, dated Sep. 20, 2007, 7pp.
International Search Report from published application No. WO2004053772 (PCT/US2003/039251), republished on Aug. 26, 2004, 3 pp.
International Preliminary Examination Report from International application No. PCT/US2003/039251, completed May 3, 2005, 9 pp.
Written Opinion of international application No. PCT/US2003/039251, mailed Sep. 15, 2004, 5 pp.
International Search Report, mailed Nov. 23, 2001, and Written Opinion, mailed Jun. 11, 2002, for international application No. PCT/US2001/019491, 9 pp.
International Search Report and Written Opinion from international application No. PCT/US2004/027165, mailed Feb. 21, 2005, 10 pp.
International Preliminary Examination Report from international application No. PCT/US2003/039517, completed Mar. 29, 2005, 6 pp.
International Search Report mailed Nov. 4, 2004, and Written Opinion, mailed Oct. 15, 2004, for international application No. PCT/US2003/039517, 13 pp.
International Preliminary Examination Report of international application No. PCT/US2001/019491, completed Dec. 1, 2002, 9 pp.
Terplan, "Web-based Systems & Network Management," CRC Press, pp. 1-43, 1999.
European Office Action from European app. 01 948 454.2-2221, dated Mar. 26, 2008, 13 pp.
Air Force Refrigerant Management Program (Quinn Hart, manager), Refrigerant Management Handbook, Jun. 1994, 267 pp.
Johnson, Developing an EPA Refrigerant Regulations Compliance Program, Mar. 29, 2002, http://web.archive.org/web/20020329172323/http://www.chemalliance.org/columns/regulatory/4_20_99.asp retrieved May 13, 2004, 6 pp.
Morphy, "Life insurers, facing pressure from different directions, turn conservative," Insurance Finance & Investment, v7, n19, p. 11, Oct. 28, 2002, Dialog file 636, Accession No. 05405189, 5 pp.
Office Action in related case U.S. Appl. No. 12/050,738, mailed Dec. 30, 2008, 22 pp.
International Preliminary Report on Patentability for international application No. PCT/US2007/068420, mailed Nov. 20, 2008, 6 pp.
U.S. Appl. No. 12/252,265, filed Oct. 15, 2008.
U.S. Appl. No. 12/253,024, filed Oct. 16, 2008.
Response to European Office Action dated Apr. 14, 2008, from related European application No. 03796979.7, dated Feb. 11, 2009, 15 pp.
U.S. Appl. No. 60/444,437, filed Feb. 3, 2003.
U.S. Appl. No. 60/433,179, filed Dec. 13, 2003.
Response to Written Opinion mailed Sep. 15, 2005, filed Dec. 15, 2005, in related international application No. PCT/US2004/003008, 7 pp.
Office Action in related U.S. Appl. No. 10/734,725, dated Feb. 26, 2009, 12 pp.
Preliminary Amendment filed Feb. 2, 2009, in related U.S. Appl. No. 10/734,725, 49 pp.
Pre-Interview Communication in related U.S. Appl. No. 10/734,725, dated Dec. 22, 2008, 19 pp.
Examination Report dated Jul. 10, 2008, in related Australian Application No. 20003297910, 7 pp.
Office Action in related U.S. Appl. No. 12/233,897, dated Jun. 29, 2009, 18 pp.

Response to European Office Action of Jan. 19, 2009, from related European application No. 07252399.6, dated Jun. 25, 2009, 10 pp.
Response to Office Action of Jun. 29, 2009, from related U.S. Appl. No. 12/233,897, filed Jul. 2, 2009, 7 pp.
Response to Written Opinion of Sep. 15, 2004, from PCT/US03/39251, dated Dec. 15, 2004, 10 pp.
Voluntary Amendment filed Mar. 24, 2009, in related Canadian Application 2651410, 7 pp.
Supplemental European Search Report dated Jun. 26, 2009, for related European application 04707768.0, 3 pp.
Notice of Allowance issued in 09/883,779, mailed Dec. 10, 2008.
Petition Under 37 CFR 1.78(a)(2) in 10/429,619, filed Jul. 21, 2004, 2 pages.
Response to Decision on petitions Under 37 CFR 1.78(a) and Under 37 CFR 1.78(a)(6), in 10/429,619, filed Feb. 11, 2005.
Decision on Renewed Petition in 10/429,619, mailed Apr. 14, 2005.
Non-Final Office Action issued in 10/429,619, mailed Sep. 25, 2006.
Amendment and Response to Office Action mailed Sep. 25, 2006 in 10/429,619, dated Jan. 25, 2007.
Notice of Allowance issued in U.S. Appl. No. 10/429,619, mailed Apr. 24, 2007.
Renewed Petition Under 37 CFR 1.78(a)(3) in U.S. Appl. No. 10/429,619, filed Jun. 15, 2007.
RCE and Preliminary Amendment filed Jul. 24, 2007 in U.S. Appl. No. 10/429,619.
Second Preliminary Amendment in U.S. Appl. No. 10/429,619, dated Jul. 25, 2007.
Non-Final Office Action issued in U.S. Appl. No. 10/429,619, mailed Sep. 19, 2007.
Amendment and Response to Office Action mailed Sep. 19, 2007 in U.S. Appl. No. 10/429,619, dated Dec. 18, 2007.
Examiner's Interview Summary issued in U.S. Appl. No. 10/429,619, mailed Dec. 27, 2007.
Final Office Action issued in U.S. Appl. No. 10/429,619, mailed Mar. 21, 2008.
RCE and Amendment filed Sep. 8, 2008 in U.S. Appl. No. 10/429,619 in response to Final Office Action mailed Mar. 21, 2008.
Notice of Allowance issued in U.S. Appl. No. 10/429,619, mailed Oct. 6, 2008.
RCE filed Oct. 10, 2008 in U.S. Appl. No. 10/429,619.
Notice of Allowance issued in U.S. Appl. No. 10/429,619, mailed Jan. 21, 2009.
Interview Summary issued in U.S. Appl. No. 10/734,725, mailed Jun. 8, 2009.
Preliminary Amendment filed in U.S. Appl. No. 10/734,725 on Jul. 24, 2008.
Decision on Petition in U.S. Appl. No. 10/734,725, mailed Apr. 13, 2007.
Response to Decision on Petition Under 37 CFR 1.78(a)(3) in U.S. Appl. No. 10/734,725, dated Apr. 10, 2007.
Response to Decision on Petition Under 37 C.F.R. 1.78(1)(3) in U.S. Appl. No. 10/734,725, filed Aug. 16, 2006.
Decision on Petitions Under 37 CFR 1.78(a)(3) and Under 37 CFR 1.78(a)(6) in U.S. Appl. No. 10/734,725, mailed Dec. 13, 2005.
Petition Under 37 CFR 1.78(a)(2) in U.S. Appl. No. 10/734,725, filed Jul. 21, 2004.
Decision on Petition Under 37 CFR 1.78(a)(3) mailed Oct. 8, 2004 in U.S. Appl. No. 10/734,725.
Notice of Allowance issued in U.S. Appl. No. 10/768,957, mailed Nov. 17, 2005.
Decision on Petition to accept an unintentionally delayed claim filed Feb. 11, 2005 in U.S. Appl. No. 10/768,957, dated Apr. 11, 2005.
Response to Decision on petitions Under 37 CFR 1.78(a) and Under 37 CFR 1.78(a)(6), in U.S. Appl. No. 10/768,957, mailed Feb. 8, 2005.
Decision on Petition filed Jul. 21, 2004 in U.S. Appl. No. 10/768,957, dated Dec. 2, 2004.
Notice of Allowance issued in U.S. Appl. No. 11/423,860, mailed Jan. 28, 2008.
Notice of Allowance issued in U.S. Appl. No. 11/431,147, mailed Oct. 31, 2008.
Notice of Allowance issued in U.S. Appl. No. 12/277,171, mailed Apr. 9, 2010.
Amendment and Response and Terminal Disclaimer to Non-Final Office Action issued in U.S. Appl. No. 12/277,171 dated Dec. 2, 2009, filed Jan. 11, 2010.
Non-Final Office Action issued in U.S. Appl. No. 12/277,171, mailed Dec. 2, 2009.
International Search Report and Written Opinion Issued in PCT/US2009/066225, mailed Mar. 1, 2010, 14 pages.
International Search Report issued in PCT/EP2009/57711, mailed Nov. 9, 2009.
Examination Report issued in Australian App No. 2004267826, dated Aug. 3, 2009.
Summons to attend oral proceedings pursuant to Rule 115(1) EPC mailed Aug. 10, 2009, in European Patent Application 01948454.2, 8 pp.
European Search Report issued in EP App 01948454 dated Nov. 3, 2005.
Response to European Office Action of Mar. 26, 2008 issued in EP 01948454 dated May 9, 2008.
Decision of the Examining Division issued in EP App 01948454, dated Jan. 14, 2010.
European Office Action issued in EP App 03812927 dated Jan. 19, 2009.
Response to European Office Action of Jan. 19, 2009 in EP App No. 03812927, dated Nov. 12, 2009.
Communication from European Patent Office issued in EP 07252399, dated Jan. 19, 2009.

Fig. 4

Active Call

| Site | T-0664 |
|---|---|
| Requester | Terry Haughton |
| Description | Lack of power. Battery appears not to be charging |
| Reason Type | |
| Out of Service | |
| Asset Type | Product 4000 |
| Asset Number | 1854 |
| Serial Number | 0059 |
| Action Type | Create Work Order |
| Status | Open |

[Save] [WO] [New]

Workspace  Filter Definition

Sites | Service & Maintenance | Asset Types | Service Providers | Manufacturers | Reports | Messages > All Work Orders > Summary > New Work Order

New Work Order — 45

| Site Name | T-0664 |
|---|---|
| Requestor | Terry Haughton |
| Asset Type | Product 4000 |
| Company Tag Number | 1854 |
| Work Order Name | Lack of Power, Batt |
| Work Order Description | Lack of Power, Battery appears not to be recharging |
| Due Date | 02/01/2001 |
| Service Provider | Company X |
| Technician | |

[Save] [Cancel]

METHOD AND SYSTEM OF ASSET IDENTIFICATION AND TRACKING FOR ENTERPRISE ASSET MANAGEMENT

CROSS-REFERENCE TO RELATED APPLICATION

This patent application is a continuation of U.S. patent application Ser. No. 11/431,147, filed May 9, 2006, which issued U.S. Pat. No. 7,474,218 on Jan. 6, 2009, which is a continuation-in-part of U.S. patent application Ser. No. 10/768,957, filed Jan. 30, 2004, which issued as U.S. Pat. No. 7,062,389 on Jun. 13, 2006, which claims the benefit of U.S. Provisional Patent Application No. 60/444,091, filed Jan. 31, 2003, and which is a Continuation-In-Part of U.S. patent application Ser. No. 09/883,779, filed Jun. 18, 2001, which issued as U.S. Pat. No. 7,496,532, on Feb. 24, 2009, which claims the benefit of U.S. Provisional Patent Application No. 60/212,234, filed Jun. 16, 2000 and U.S. Provisional Patent Application No. 60/288,827, filed May 5, 2001, the contents of which are each incorporated herein by reference in their entirety. U.S. patent application Ser. No. 11/431,147, filed May 9, 2006, is also a Continuation-In-Part of U.S. patent application Ser. No. 10/429,619, filed May 5, 2003, which issued as U.S. Pat. No. 7,512,523 on Mar. 31, 2009, which claims the benefit of U.S. Provisional Application No. 60/432,120, filed Dec. 9, 2002; and U.S. patent application Ser. No. 11/431,147 is a Continuation-In-Part of U.S. patent application Ser. No. 10/734,725, filed Dec. 12, 2003, now abandoned, which claims the benefit of U.S. Provisional Patent Application No. 60/433,179, filed Dec. 13, 2002; and U.S. patent application Ser. No. 11/431,147 is a Continuation-In-Part of U.S. patent application Ser. No. 10/771,090, filed Feb. 3, 2004, now abandoned, which claims the benefit of U.S. Provisional Patent Application No. 60/444,437, filed Feb. 3, 2003; and U.S. patent application Ser. No. 11/431,147 is a Continuation-In-Part of U.S. patent application Ser. No. 10/922,364, filed Aug. 20, 2004, now abandoned, which claims the benefit of U.S. Provisional Patent Application No. 60/496,432, filed Aug. 20, 2003, the contents of which are each incorporated herein by reference in their entirety.

FIELD OF THE INVENTION

This invention relates to a method and system for managing enterprise assets. More particularly, the invention relates to a method and system for the comprehensive management of enterprise assets dispersed over a plurality of distributed sites utilizing wireless tag technology.

BACKGROUND OF THE INVENTION

It is frequently useful to track the disposition of enterprise assets and further monitor and manage various aspects of those assets. For example, it is useful to track the total cost of asset ownership for accounting purposes and for making future purchasing decisions. However, tracking specific assets and asset characteristics in a large, distributed environment (an enterprise that has many facilities at differing locations, as well as one or more central headquarters) can be a difficult task.

A large retail store chain, for instance, may wish to determine the total cost of ownership for each cash register it owns. A highly distributed retail chain may have tens of thousands of cash registers, and in order to calculate a reasonably accurate determination of the total cost of ownership the retail chain must accurately track all the costs that are incurred for each cash register. The purchase price of an asset, repair costs, and maintenance costs are the main components of the total cost of ownership and so these costs need to be tracked, in some instances other factors such as energy costs may also need to be factored into the calculation.

However, tracking costs incurred in repairing and maintaining these assets can be an onerous task. In a typical procedure to service assets, a store manager first calls a service provider to perform a task on an asset. The service provider performs the task required, seeks approval for the work, and then fills out work order papers in triplicate. The work order papers are typically distributed (one copy each) to the enterprise headquarters, the store, and the service provider. The service provider then creates an invoice and sends it to the enterprise headquarters. If the accounts payable department of the enterprise headquarters can locate the work order papers, the invoice may be entered into the system and paid. If the work order papers cannot be found, the invoice may be sent to the store manager for approval, returned to the enterprise headquarters after approval, and then entered into the accounts payable system.

Tracking part and labor costs and any other asset characteristics in highly distributed enterprises thus becomes very difficult using the existing process described above. Matching paperwork with assets may become exceedingly difficult due to the sheer volume of assets and the large amounts of paperwork generated in servicing and maintaining the assets.

Another potential problem with the process described above is that service providers may be able to overbill for service calls or parts without full knowledge by the enterprise of the nature of the service call. The lack of overview on a regional or national level may prevent an enterprise from determining if the costs incurred by distributed sites for an asset is reasonable.

Because it is time consuming and expensive to collect paper work from numerous sources to even have the capability of accurately calculating the total cost of ownership for an asset, the cost of ownership of many assets is frequently a guess that may vary greatly from the actual cost of ownership. Thus, enterprises frequently determine the cost of ownership for an asset to be the purchase price of the asset, which is typically considerably less than the actual cost of ownership. Moreover, in a highly distributed environment, there are many assets to manage, and current systems do not provide feasible and efficient methods and systems for managing such assets. In particular, current systems do not provide for an efficient manner to determine the costs of servicing and maintaining assets or the total cost of ownership of an asset.

There is a need in the art for a method and system for managing enterprise assets over numerous distributed sites that is user friendly, cost and time efficient, and that may be used to accurately generate the cost of ownership for one or more assets of an enterprise. A need also exists for a common platform that may be used to set up information systems and gather accounting information for managing these assets including total cost of ownership accounting.

BRIEF SUMMARY OF THE INVENTION

The present invention, in one embodiment, is a system for managing a plurality of assets of a plurality of distributed enterprises and allowing a user to access asset information. The system includes a central processor, a database, a tag reader in communication with the central processor, and an asset tag. The database is a database for storing asset information for the plurality of assets of the plurality of enterprises and is in communication with the central processor. The asset information includes information relating to ownership, maintenance and repair of the plurality of assets. An asset tag is associated with each of the plurality of assets and includes specific information regarding the asset to which it is associated. Further, the tag is configured to communicate with the tag reader. The central processor tracks information relevant to managing each of the plurality of assets.

The present invention, in another embodiment, is a system for collecting information relating to equipment located at a site. The system includes a first database, a server, and a tag reader. The first database includes legacy data relating to at least a portion of the equipment. The server includes software for importing the legacy data into a specified data structure and for exporting the specified data structure and a survey process. The tag reader is for receiving the specified data structure and the survey process and for guiding a user in collecting the information and further is configured to receive information from individual equipment tags. The specified data structure includes a set of equipment categories and a set of attributes relating to each category.

In another embodiment, the present invention is a method of tracking service of an asset in a highly distributed enterprise. The method includes providing at least one server computer in communication with a computer network and a database operably coupled with the server computer. The database contains asset information and service provider information. The method further includes receiving a service request at the server computer for an asset and automatically selecting an appropriate service provider based on the asset to be serviced. In addition, the method includes generating an electronic message to the appropriate service provider requesting service, whereby a service technician is scheduled to provide service. The service technician has an identification tag associated with the service technician. Further, the method includes tracking a location of the identification tag of the service technician with a tag reader.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 4 is an embodiment of a web page for inputting a service request, according to one embodiment of the present invention.

FIGS. 7A-1 and 7A-2 are two parts of a diagram depicting exemplary information collected for various types of equipment, according to one embodiment.

DETAILED DESCRIPTION

The present invention relates to a method and system of asset identification and tracking utilizing wireless technology. For example, according to one embodiment, assets can be identified and tracked using radio frequency ("RF") technology. More specifically, the present invention can incorporate radio frequency identification ("RFID") technology to identify and track assets.

In one aspect of the invention, the method and system relate to providing a wireless tag associated with an asset for purposes of tracking or managing the asset. According to one embodiment, the wireless tag can store information about the asset such as, for example, identification, location, and other information, and communicate with an asset management system to provide for tracking and management of the asset. In a further embodiment, the present invention provides a wireless tag that is associated with a user of the asset and/or the asset management system such that the user's interaction with the asset or system can be simplified or tracked or otherwise managed. The wireless tag, in one example of the present invention, is an RFID tag.

In an asset management system, according to one embodiment, all of the assets may need to be inventoried and an asset identifier created for each asset to give it a trackable identity. In such an embodiment, the wireless tag can be used to track the identity. That is, information about the asset can be stored on the tag and utilized to track and/or manage the asset. According to another embodiment in which the asset management system is used to track the costs of assets and to facilitate the servicing of assets, the wireless tag can be used to store information about the asset cost and service events and can also be used to help the service provider locate the particular asset to be serviced.

According to one embodiment, the asset identification system of the present invention is used with a system and method of asset management such as that system disclosed in U.S. application Ser. No. 09/883,779, filed on Jun. 18, 2001 and entitled "Method and System for Managing Enterprise Assets", which issued as U.S. Pat. No. 7,496,532, on Feb. 24, 2009, ("'779 Application"), which is incorporated by reference herein in its entirety. That system provides for, among other things, tracking the costs of assets and facilitating the servicing of assets, including assets in an enterprise.

Figure 1:
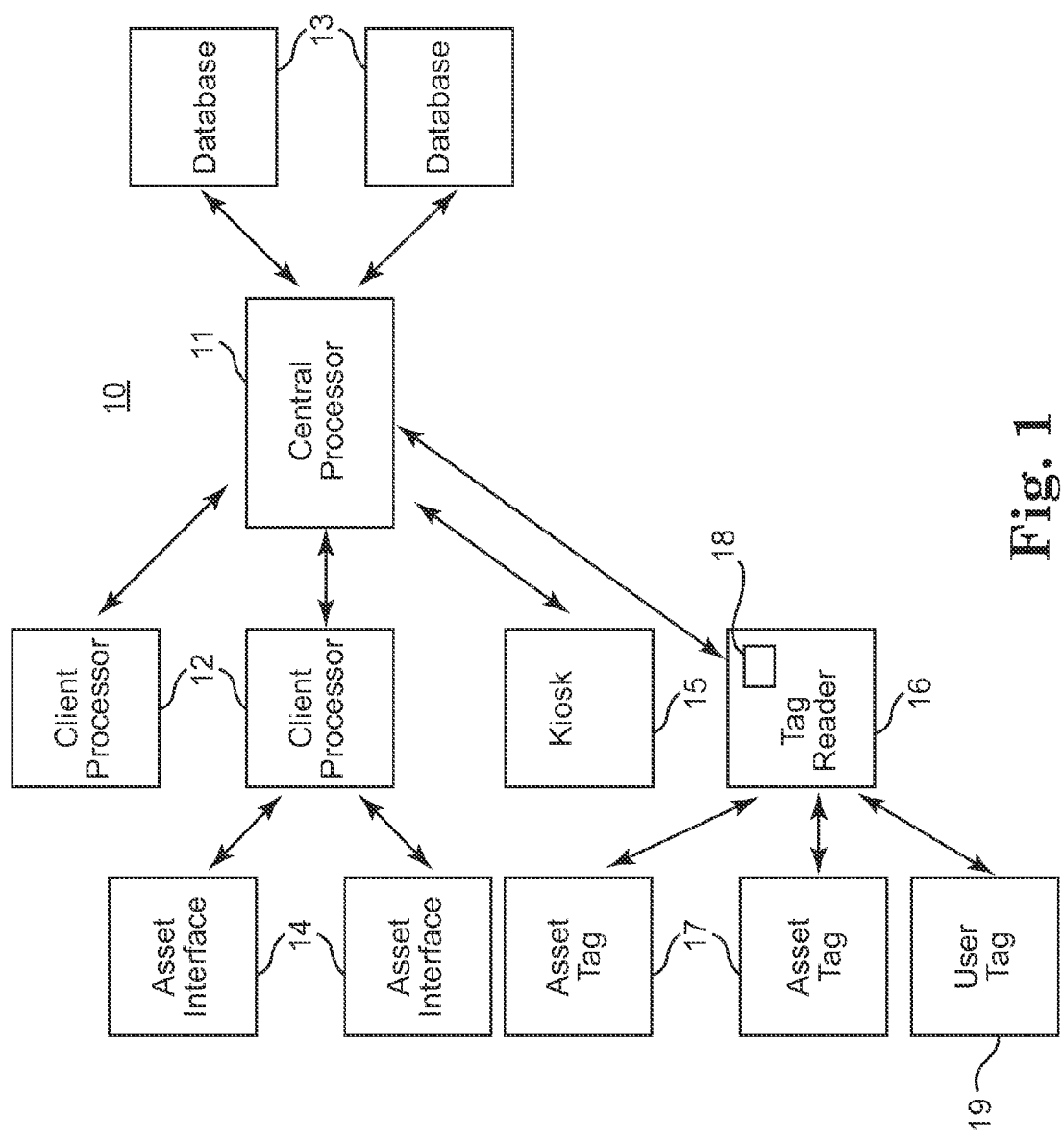
FIG. 1 is a block diagram showing the various components of the enterprise asset management system, according to one embodiment of the subject invention.

An asset management system 10 utilizing wireless tag technology is depicted in FIG. 1, according to one embodiment of the present invention. This embodiment is comprised of a central processor 11 located at a central location, one or more databases 13 to store asset information, a plurality of client processors 12 located at a plurality of remote locations, and at least one tag reader 16 located at a remote location or locations. The central processor 11 allows access by the client processor to various network resources and includes software programs or instructions that run on the server-side to process requests and responses from a client processor 12. The system 10 can also include one or more databases 13 for storing asset information. These databases 13 may be integral to the central processor 11 or they may be accessible to the central processor through a computer network or other suitable communication link. In one embodiment, the system 10 also includes asset interfaces 14 connected directly to particular assets, and one or more kiosks 15 acting as a client processor 12.

The term "asset" as used herein shall mean any physical item, including any piece of equipment or component thereof, that may be tracked and/or managed for inventory, location, maintenance, or repair purposes. For example, the "asset" can be, but is not limited to, a computer, a refrigerator, a container such as, for example, a refrigerant container, an HVAC unit, a piece of furniture, a forklift, a vehicle, or some component of any of these items.

Figure 6:
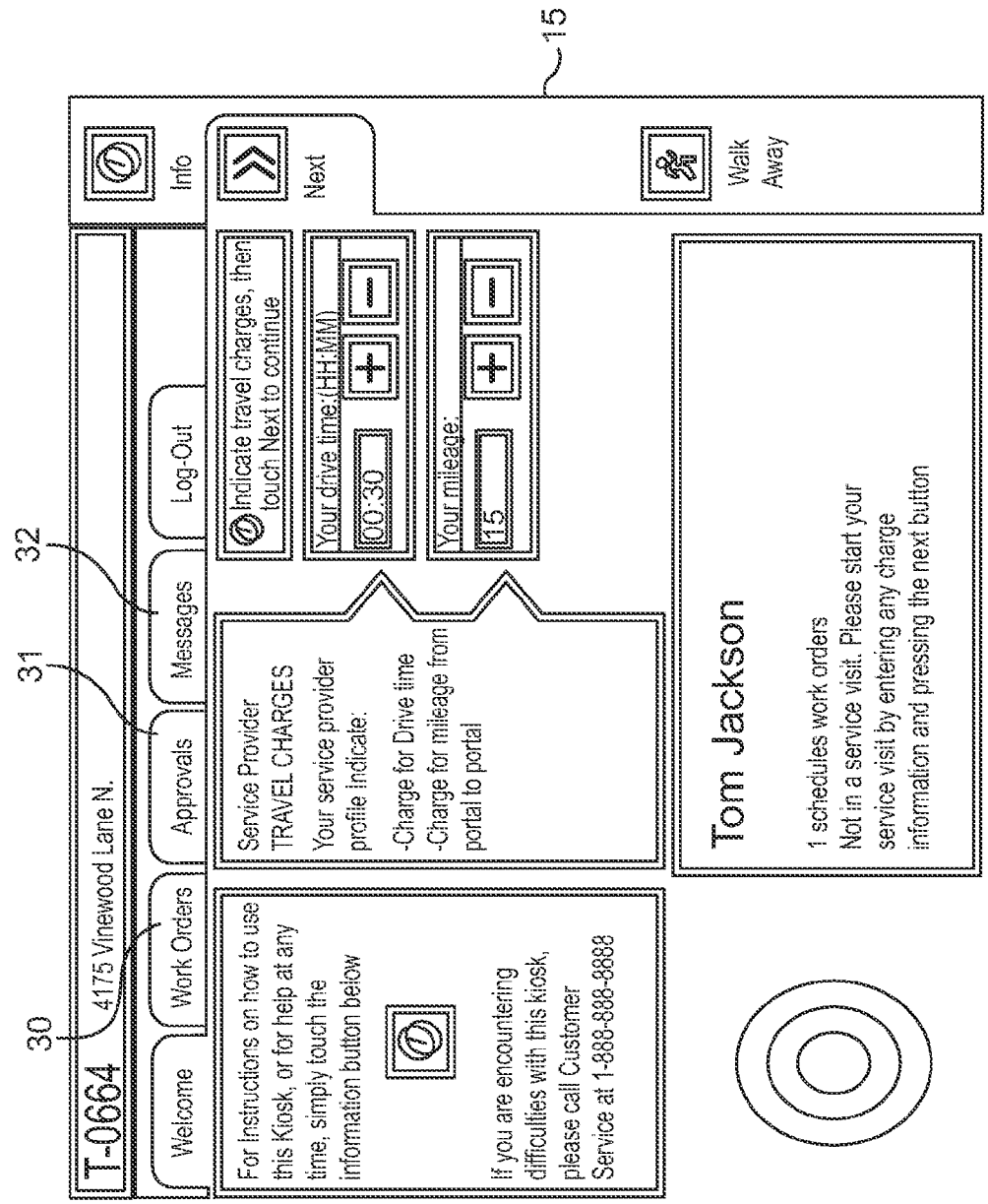
FIG. 6 is an embodiment of a screen display for a kiosk.

The client processor 12 may be any computer or computer systems used by those skilled in the art. Client processor 12 can be used to place work orders, view asset information, input asset information, change the operational parameters of an asset, exchange data with the central processors, and/or to view and manipulate asset information. Some client processors 12 can be configured as kiosks 15 and located at one or more remote sites. The kiosks are adapted for use by service providers onsite, to access the central processor 11 to view asset information or service requests. As shown in FIG. 6, these kiosks can include a preconfigured menu which allows service providers to access the central processor 11, to enter and receive information concerning work orders 30, to check if a particular work order has been approved 31, and to check for messages 32.

In some embodiments, asset interfaces 14 are attached to assets with communications capabilities in order to monitor and/or control their performance. The asset interface 14 can be configured to communicate with the asset and to provide a communication link between the asset and a client processor 12 or the central processor 11. Communication technology, such as a cellular modem, any other wireless communication system (such as Cellular Digital Packet Data (CDPD) technology), and/or a landline communication system may be used to form a communication link between the asset interface and a client processor 12 or the central processor 11.

As shown in FIG. 1, a communication link exists between a client processor 12 and the central processor 11. Upon specification of a link by the user, the client processor 12 makes a TCP/IP request to the central processor 11 and receives information, which may be a "web page" that is formatted according to HTML which also includes links to other pages of information. Users can also access other pages on the same or other database server by following instructions on the screen, entering certain data, or clicking on selected icons. In one embodiment, the subject invention is a web-site hosted by at least one computer in communication with the Internet. This embodiment allows the subject invention to be accessed through a client computer 12 by various types of users located at geographically distributed sites. To limit access to authorized users, in one embodiment, the subject invention allows for various types of users and users at various distributed sites to have distinct levels of access.

The tag reader 16 as depicted in FIG. 1 can be any known device for communicating with a tag. For example, in embodiments in which the tag is an RFID tag, the reader 16 is an RFID reader 16 known in the art. The tag reader 16 is communicatively coupled to the central processor 11 via a communication link as shown. Alternatively, the tag reader 16 is coupled to a client processor 12. When information is transmitted from the tag 17 to the tag reader 16, that information can then be transmitted to the central processor 11 for storage in a database 13 or other use. Alternatively, according to embodiments in which the asset tag 17 can receive and store data and the tag reader 16 can also write to the tag 17 (that is, the component is a tag reader/writer 16), information can be retrieved from the central processor 11 and transmitted to the asset tag 17 by the tag reader/writer 16.

Any type of information regarding the asset can be stored on the tag. For example, the asset information can include a unique designation to identify the asset (also referred to herein as "unique identifier"), asset type, asset brand, asset use, asset location, and any other information that it may be desirable to track. In one aspect of the invention, the asset information can include servicing or maintenance information (such as, for example, the date of the last servicing of the asset), authorizations relating to location and servicing of the asset (such as, for example, whether the asset can be moved to different locations and which service providers are allowed to provide service to the asset), and any other relevant information.

Figure 2:
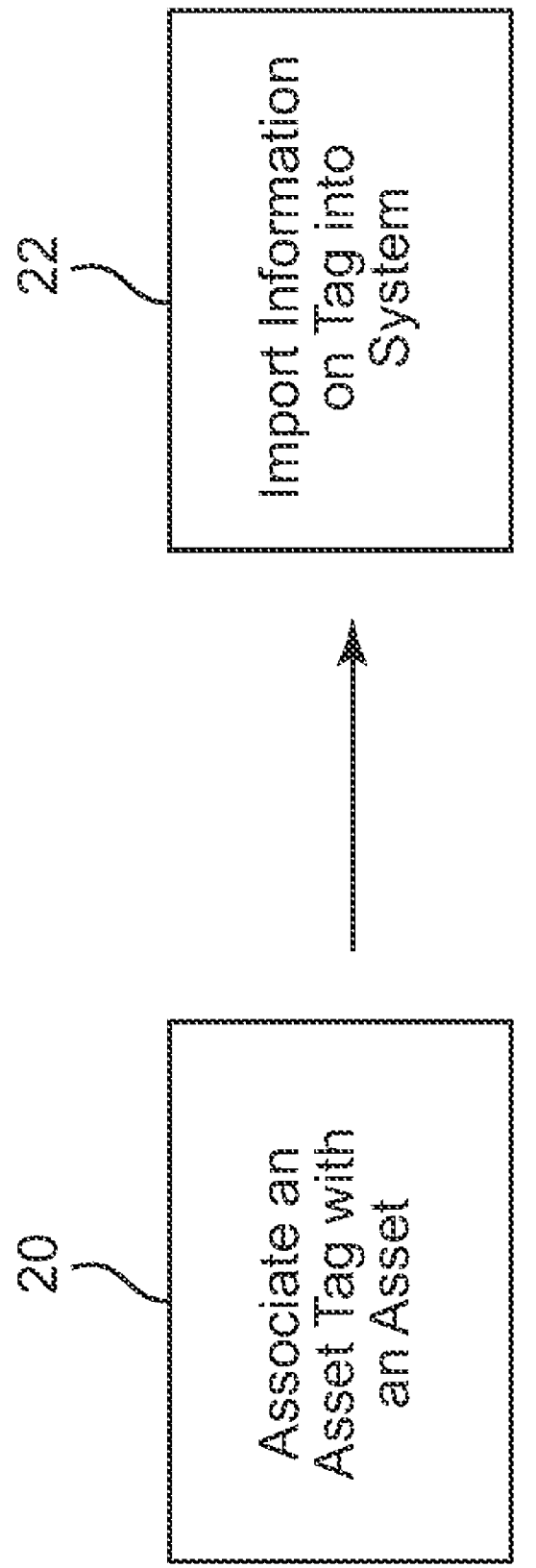
FIG. 2 is flow diagram of a survey method, according to one embodiment of the present invention.

In use, the subject invention can be used to track the costs of assets and to facilitate the servicing of assets. As an initial procedure, the assets of an enterprise may be inventoried (also referred to herein as "surveyed") and an asset identifier created for each asset to give it a trackable identity. According to one embodiment as depicted in FIG. 2, the survey method can include associating an asset tag with an asset (block 20), wherein the asset tag includes a unique identifier for the asset. In one example, the asset tag is an RFID tag. The asset tag is read by the tag reader and the information from the tag is thereby imported into the system such that the unique identifier is imported into the system for storage and processing (block 22).

In one aspect of the invention, the surveying and importation of asset data can be accomplished according to the methods and systems disclosed in U.S. application Ser. No. 10/771,090, filed on Feb. 3, 2004 and entitled "Site Equipment Survey Tool", now abandoned, ("'090 Application"), which is incorporated herein by reference in its entirety. According to one embodiment of the present invention, the assets surveyed in the '090 Application are each associated with an asset tag and the survey tool disclosed in the '090 Application is a tag reader. Typically, an enterprise will have some pre-existing legacy data relating to equipment located at its site or various distributed sites. If present, this legacy data is reviewed to establish an appropriate data structure for the following survey process. For example, in one embodiment, the data is reviewed to identify exemplary equipment categories and subcategories for inclusion in the data structure. The present invention is flexible and configurable and allows creation of a variety of data structures, as needed. Also, the information or fields gathered for each equipment asset are fully configurable and customizable. The desired fields depend on the goals and objectives of the enterprise. Generally, the more tasks that the enterprise would like to perform, the more fields that are included in the data structure.

Figures 1, 7A:
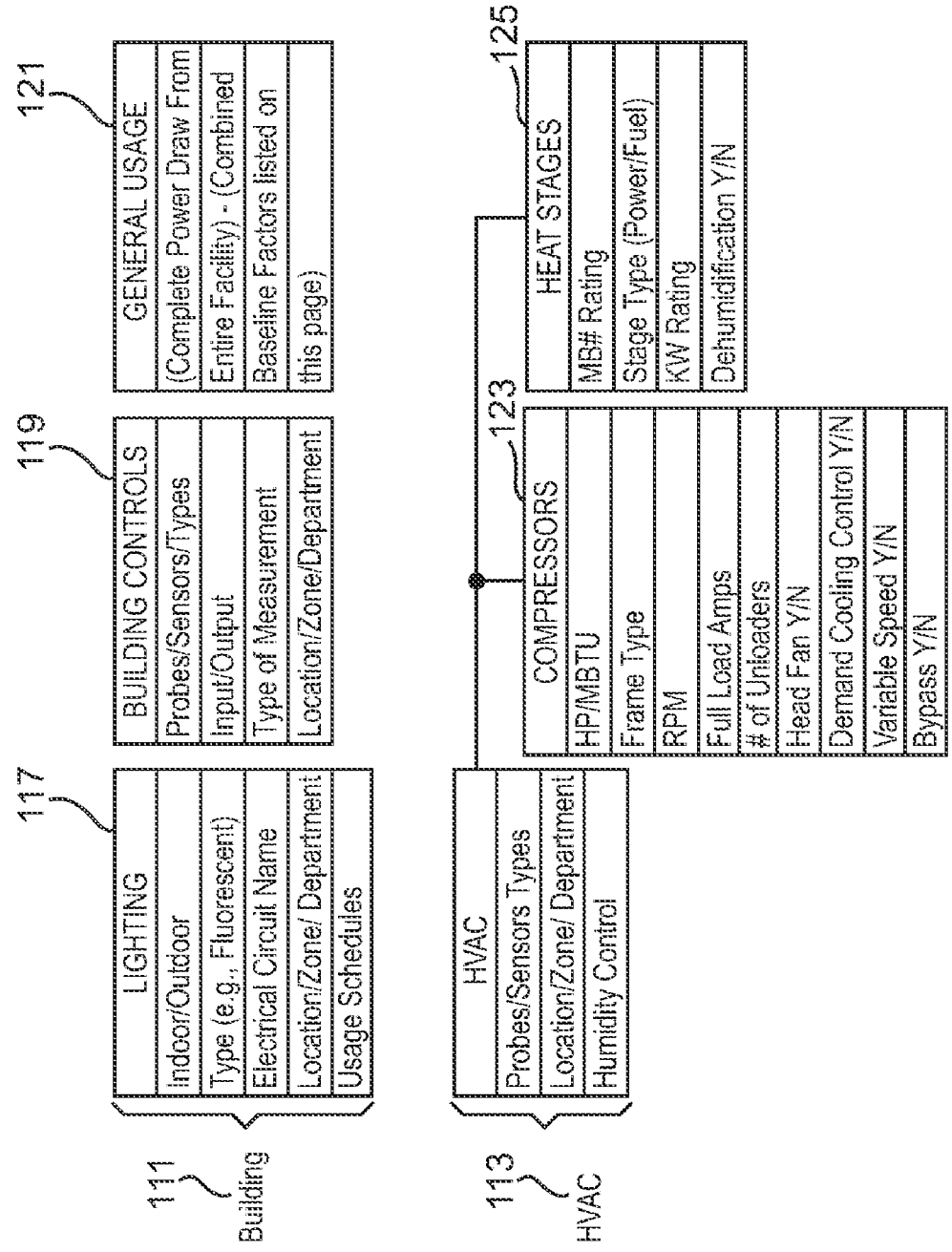
Figures 2, 7A:
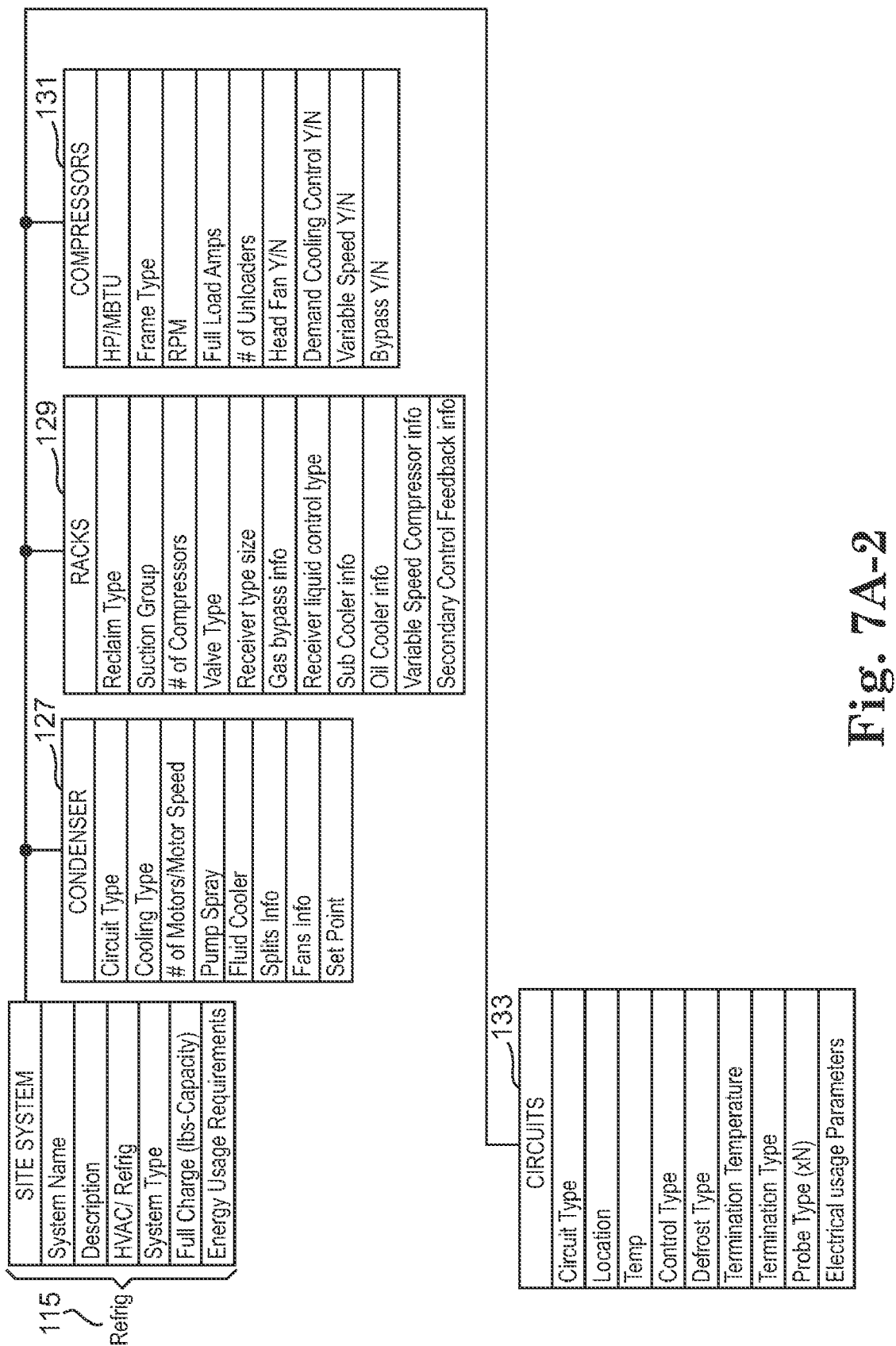

For example, if one of the goals of the enterprise is to perform energy management, certain information relevant to energy management is included in the fields specified by the data structure. FIG. 7A (depicted as FIGS. 7A-1 and 7A-2) is a diagram showing the information collected for various types of equipment, according to one embodiment of the present invention. As shown in FIG. 7A, equipment may be placed into three categories, namely building 111, HVAC 113, and refrigeration 115. The embodiment of FIG. 7A further categorizes building 111 into lighting 117, building controls 119, and general usage 121. As shown, HVAC 113 is further categorized into compressors 123 and heat stages 125, and refrigeration 115 is further categorized into condensers 127, racks 129, compressors 131, and circuits 133. FIG. 7A further shows several example fields of information that may be collected for each type of equipment.

Figure 7B:
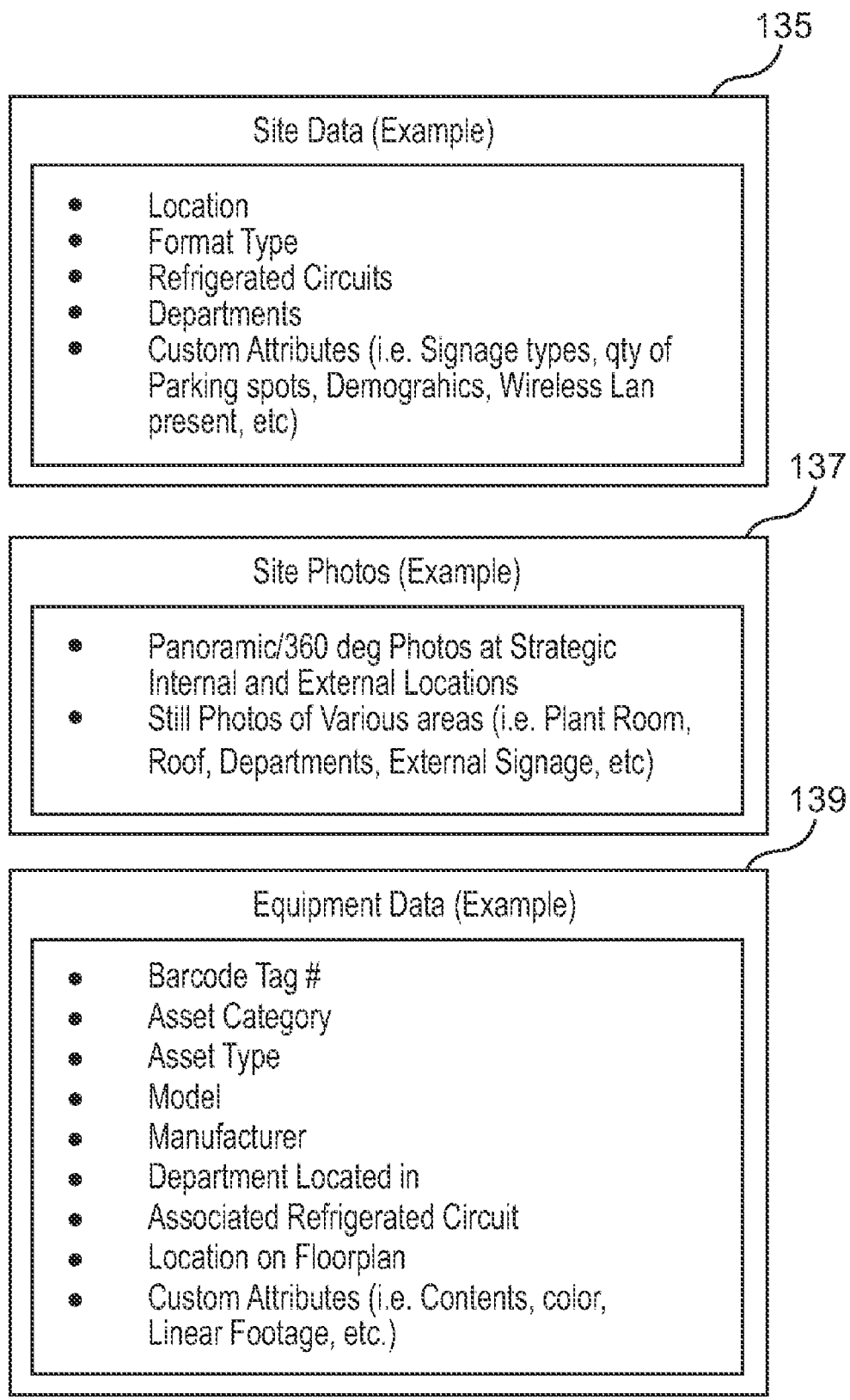
FIG. 7B is a diagram depicting exemplary information collected for various types of equipment, according to a further embodiment.

FIG. 7B is a diagram showing the information collected from a site, according to another embodiment of the present invention. As shown in FIG. 7B, information may be placed into three categories, namely site data 135, site photos 137, and equipment data 139. The embodiment of FIG. 7B further shows several example fields of information that may be collected for each category.

Further exemplary fields are disclosed in co-pending U.S. patent application Ser. No. 10/768,957, entitled "Enterprise Energy Management System," filed on Jan. 30, 2004, which issued as U.S. Pat. No. 7,062,389, which is incorporated herein by reference in its entirety and claims priority to U.S. provisional patent application No. 60/444,091, filed on Jan. 31, 2003.

According to an alternative aspect of the present invention, the information collected may be any known or collectable equipment information or data of any kind.

Creation of a data structure further includes, where appropriate, identifying acceptable entries or attributes for a particular field relating to a piece of equipment. In one embodiment, the acceptable attributes are determined by reviewing the legacy data and identifying likely attributes for a site or a set of sites. In another embodiment, the acceptable attributes are set using the knowledge of one skilled in the art. The use of a set of acceptable attributes assures uniformity and consistency of the data, such that the same asset located throughout a set of distributed sites is consistently given the same name and set of descriptions. This approach allows robust and accurate tracking and management of equipment assets.

Once a data structure, including fields of interest and acceptable attributes, is specified, the legacy data (assuming legacy data exists for the enterprise) is imported into this data structure. According to one embodiment, this legacy data can serve as the starting point for the survey process.

The use of the tag reader to input asset information has numerous advantages over manual input. Tag reader-based input is faster, more efficient, and more accurate than manual input of information.

According to another embodiment, the wireless tag-based system of the present invention provides accurate tracking of asset disposition. That is, the system and method of the present invention provides for tracking the physical location of and any movement of an enterprise asset, such that all assets at a particular location can be monitored such that movement of any existing asset out of that location or any importation of a new asset into the location can be monitored. In one aspect of the invention, the tag reader of the present invention can be an RFID portal through which all assets are transported into and out of an enterprise location. According to one embodiment, the tag reader 16 in FIG. 1 can be an RFID portal. For example, a piece of equipment having an asset tag providing the unique identifier A1 can be imported into a location through an RFID portal that reads the tag and transmits the information about the importation of the piece of equipment into the location into the asset tracking system. Further, if the piece of equipment is later transported out of the location, it can be transported through the portal such that the movement of the asset out of the location is recorded by the system. According to another embodiment, the movement of the asset can trigger the asset tracking system of the present invention to transmit a message to an appropriate user. The message can prompt the user to confirm that the transport of the asset is authorized. Alternatively, the message can inform the user that the asset is being transported to the user and requesting confirmation of receipt. In a further alternative, the message can provide any appropriate information relating to the asset and/or its transport.

The tag reader, according to one embodiment, can utilize and provide certain information relating to the asset tags without utilizing its connection to the central processor of the system. More specifically, the tag reader can provide automatic alarms or notifications that are triggered at the reader, not at the central processor or any other part of the system. According to one embodiment, the tag reader 16 in FIG. 1 has an automatic alarm component 18. For example, in one embodiment, when an asset that is not authorized for removal is transported through or past the tag reader, an audio and/or visual alarm associated with the tag reader is triggered by the tag reader. This occurs because the tag associated with the asset includes information that the asset is not to be removed from the site and the tag reader "reads" the information on the tag and the alarm is automatically triggered by the tag. Alternatively, any information can be included in the tag that can trigger an automatic alarm or any other known action at a tag reader for any known purpose.

The asset tracking of the present invention as described herein provides for checking an asset in or out at a location or site. Further, the system allows for highly accurate equipment inventory tracking, including tracking unauthorized removal of equipment from a site. In one embodiment, a tag can be associated with an asset (that is, the asset can be "tagged") by a manufacturer or supplier prior to delivering the asset to the location. In accordance with another embodiment, the wireless tag-based system of the present invention can be used to track a mobile asset and its movement within a location. For example, the system can be used to track the movement of such equipment as a pallet jack, a forklift, a rolling rack, or any other mobile piece of equipment.

In accordance with an additional embodiment in which the system and method of the present invention relates to tracking and management of refrigerant for HVAC systems, the system and method provides for associating a wireless tag with each refrigerant container. Each tag for each container includes a unique identifier for each container, thereby allowing for monitoring the inventory of all such containers. Due to the nature of the industry, cylinders are often moved between the refrigerant supplier and the HVAC system operator and are often re-used. With the existing technology, each supplier and operator typically places a service tag or identifier on the cylinder upon periodic servicing or refilling of the cylinder such that the end-result is multiple identifying marks on the cylinder. These multiple stickers or tags make it difficult to identify the single appropriate reference. With the wireless tag-based system of the present invention, visual ID reference is unnecessary when identifying and monitoring each cylinder. According to one embodiment, the wireless tag technology of the present invention can be utilized with the system and method of refrigerant tracking disclosed in U.S. application Ser. No. 10/429,619, filed on May 5, 2003 and entitled "Refrigerant Loss Tracking and Repair," which issued as U.S. Pat. No. 7,512,523 on Mar. 31, 2009, which is incorporated herein by reference in its entirety.

According to another embodiment, the tags could also be used to track an asset that is shipped off-site for maintenance or repair, including tracking the asset at the maintenance or repair location. In a further embodiment, the location information relating to any asset can be provided by the system to a service provider to assist the provider in locating the asset For example, the system can provide the service provider with the specific site where the asset is located and further provide the specific location of the asset at the site. In one embodiment, the wireless tag-based system of the present invention can be used with the system and method of tracking asset repair and maintenance costs and monitoring asset servicing as disclosed in the '779 application which is incorporated herein.

In one aspect of the invention in which the system is used to track repair and maintenance costs and to monitor the servicing of assets, the subject invention includes a system and method for managing the servicing and maintenance of assets by third-party service providers or in-house personnel.

Figure 3:
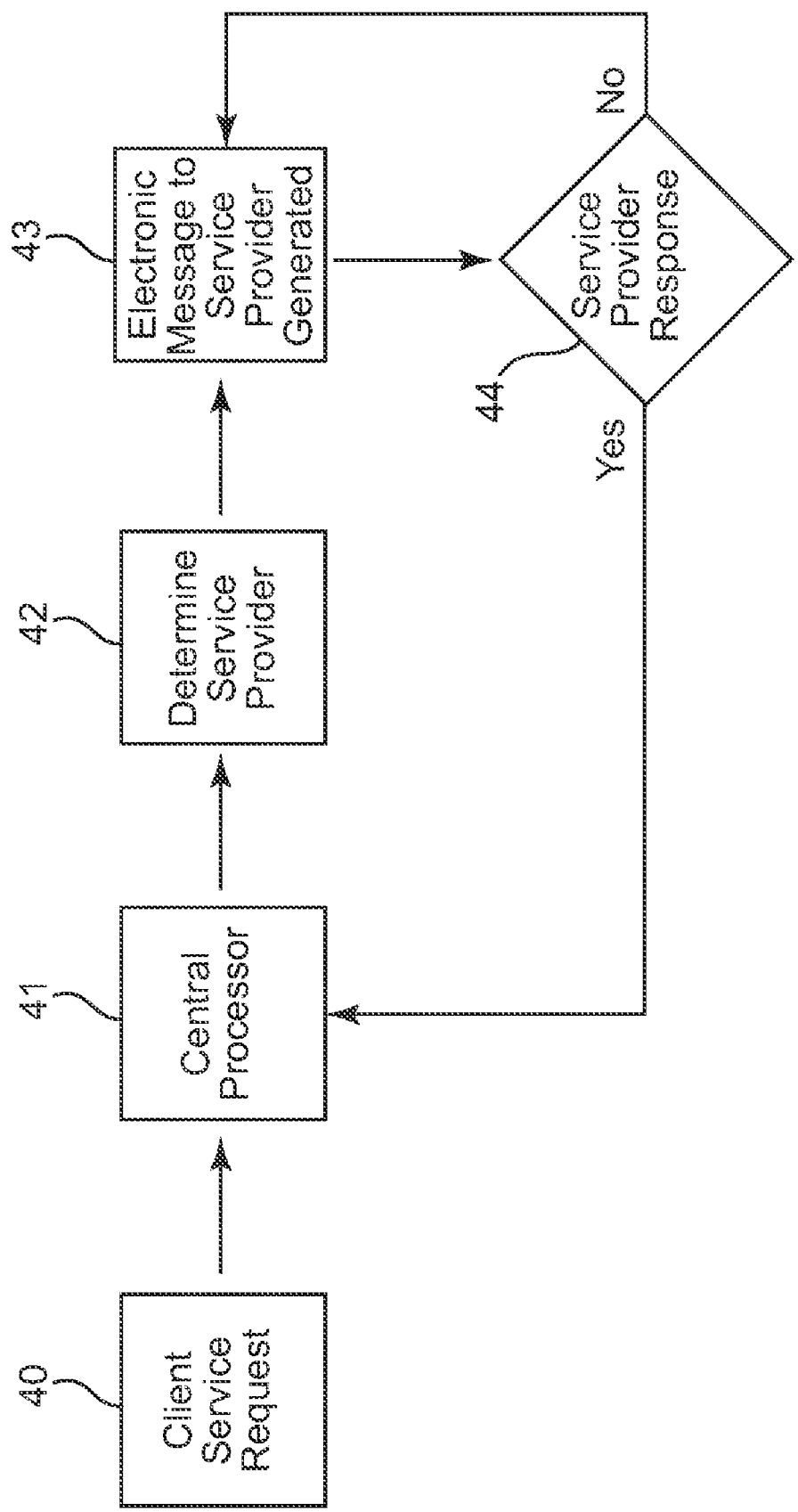
FIG. 3 is a flow diagram of a service request, according to one embodiment of the present invention.

As shown in FIG. 3, the method generally comprises generating a service request from a client computer (block 40), receiving a service request at the central processor 11 through the web site (block 41), determining a service provider (block 42), automatically transmitting to the service provider the service request and any additional asset information which may be needed by the service provider, including the asset location information previously inputted into the system by the tag reader (block 43), and awaiting a response to the service request (block 44). If no response is received within a predetermined period of time, the electronic message is resent (block 43).

As shown in FIG. 4, a service request from a user will generate an electronic work order 45 containing information such as the asset to be repaired, location of the asset site, location of the asset at the site, the reported problem, and the asset identifier. Typically, a service request is initiated by enterprise employees located at a remote site through the use of a client computer 12. In some instances, a particular asset may have self-diagnostic programs that can determine a malfunction and generate an error signal. These assets may have asset interfaces 14 interfaced thereto enabling them to generate service requests automatically through a client computer 12.

In one embodiment, an identification of authorized service personnel is maintained in a database and linked to particular assets. Once a service request is processed by the central processor 11, a service provider is determined automatically by determining which service provider is linked to the particular asset and a particular geographic location, and the service provider is notified automatically via an E-mail message or other form of electronic messaging. If the service provider does not respond to an E-mail within a specified period of time, additional E-mails may be sent automatically. The E-mail can include the type of asset requiring service, the reported failure, location, contact person, and prior service history of the asset. In addition, the service provider may also obtain additional information on the asset by accessing the central processor 11 via the Internet or a kiosk 15.

According to one embodiment of the present invention, the wireless tag-based system and method of the present invention can be used to track the service completion. In this embodiment, a tag can be associated with the service provider technician such that the person's movements can be tracked during the completion of the service request. More specifically, in accordance with one aspect of the invention, the service technician passes through or by a tag reader such as an RFID portal when the technician enters the site to complete the service request. The RFID portal reads the information on the tag and thereby verifies the presence of the technician at the site. In a further embodiment, the system can not only verify the presence of the technician but can also confirm that the technician has authorization to enter the site and provide service to the asset needing service. Further, the system can be used to monitor the technician's movements within the site and also confirm the exit of the technician from the site. According to one embodiment, the system 10 depicted in FIG. 1 has a user tag 19.

After a service request is completed, information pertaining to the repair or maintenance of an asset may be gathered from service providers through the web site or through a client computer 12 or a kiosk 15 and stored in the database 13. In one example, the client computer 12 is any wireless handheld device. According to one embodiment, the system of the present invention allows the technician access to the client computer 12 or kiosk 15 using the wireless tag technology. That is, a tag reader located at the client computer 12 or kiosk 15 reads the technician's tag when the technician is in appropriate proximity with the computer 12 or kiosk 15. The tag reader provides information stored in the tag to the system of the present invention and the system uses the information about the technician to determine if the technician has authorization to access the computer 12 or kiosk 15. If the technician has authorization, the system configures the computer 12 or kiosk 15 such that the technician can use it to input information about the repair or maintenance into the system. In one example, the cost of replacement parts may be inventoried in the database of the system and the service provider may choose, while at the remote location of the facility, the type of replacement part that is used. The cost of this replacement part, therefore, may be allocated to the asset that was repaired. In addition, the cost of the service charge may be ascertained based on the length of the visit of the service provider and this cost of service may be allocated to the repaired asset. The submission of information relating to the service provided can also be used to trigger payment for the service.

Alternatively, after a service request is completed information pertaining to the repair or maintenance of an asset can be written into the asset tag associated with that asset. According to one embodiment, the system of the present invention allows the technician or another user to utilize a wireless writing device such as a handheld RFID writing device to write information into the tag about the service performed. The information can include the date of the service, the details of the service performed, the cost of the service, including any costs for the service, including costs for replacement parts or additional parts, and any other relevant information. Subsequently, this information can be "read" by any tag reader, including, for example, a wireless handheld tag reader used by a service provider or other user who is scanning various assets to determine the last date of service of each asset or to determine other service-related or asset-related information. In one embodiment, the service information stored in the tag can also be read by a tag reader that then transmits or loads the information into the central processor.

Since the maintenance and repair costs as well as purchase price comprise a majority of the total cost of ownership of an asset, a relatively accurate calculation can be obtained by summing up the three. Other factors such as energy costs, performance costs, and other can also be factored into the calculation if these factors are stored for the particular asset. To calculate the total cost of ownership, the total costs for maintenance and repair and the purchase price for an asset or a group of assets is compiled using the filtering procedures above and the values are summed together. In one embodiment of the present invention, the calculation is pre-programmed into software located in the central processor 11 and the calculation is done automatically by simply selecting the function and inputting the asset identifiers.

Figure 5:
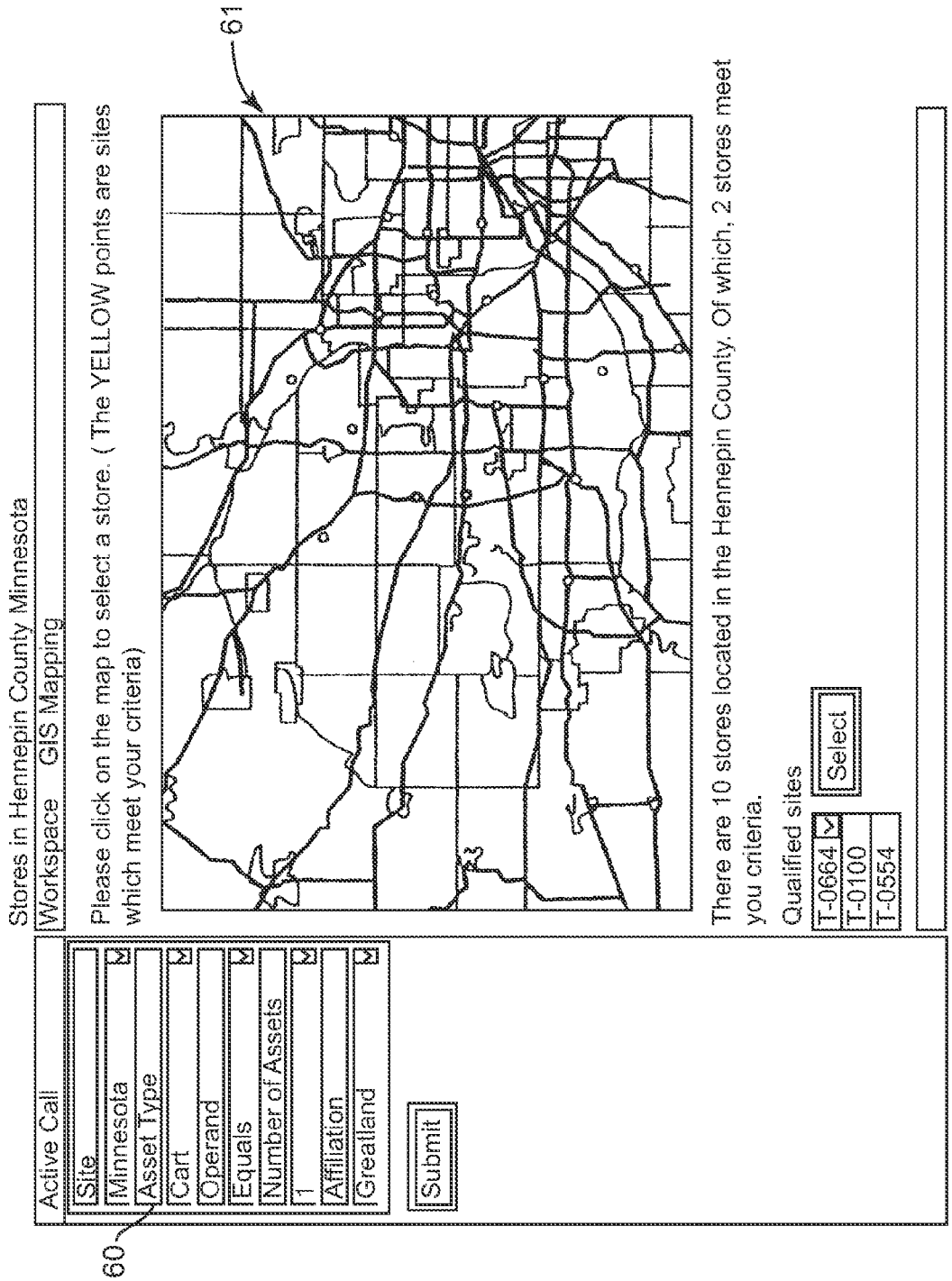
FIG. 5 is one embodiment of a GIS map produced by the subject invention.

In a distributed business environment, assets may be distributed over a large geographic region in a large number of separate facilities. As shown in FIG. 5, to track these assets geographically, one embodiment includes an application for creating a Geographic Information System (GIS) map locating a particular asset or a particular group of assets. A set of queries 60 are displayed on a client processor 12 pertaining to an asset or group of assets such as a particular asset type and a desired location. The central processor 11 then generates a map 61 based on the responses to these queries.

This embodiment can also include a mapping system displaying a single enterprise facility. Icons representing certain types of assets may be dragged and dropped onto a GIS map of a particular facility in order to display the location of assets within a facility on a scaled map. According to an alternative embodiment, the tags of each asset can be monitored wirelessly in order to determine the location of each asset at a site using a tag reader.

While the subject invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims, nor is the claimed invention limited in applicability to one type of computer or computer network. Any numbering or ordering of elements in the following claims is merely for convenience and is not intended to suggest that the ordering of the elements of the claims has any particular significance other than that otherwise expressed by the language of the claims.

What is claimed is:

1. A system for managing a plurality of assets and allowing a user to access asset information, the system comprising:
    (a) a central processor accessible on a computer network;
    (b) a database for storing asset information for a plurality of assets, the database being in communication with the central processor, wherein the asset information comprises at least information relating to location, ownership, maintenance and repair of the plurality of assets;
    (c) at least one tag reader in communication with the central processor, wherein each of the at least one tag readers is associated with one of a plurality of distributed sites;
    (d) an asset tag associated with each of the plurality of assets, each asset tag comprising at least a unique identification for an asset with which the asset tag is associated, the asset tag configured to communicate with the tag reader; and
    (e) tracking software associated with the central processor, the tracking software configured to track a location of each of the plurality of assets.

2. The system of claim 1, wherein the tracking software is configured to track movement of any of the plurality of assets into or out of any of the plurality of distributed sites based on information collected by the at least one tag reader from the asset tag of any asset being moved.

3. The system of claim 2, wherein the tracking software is configured to update the asset information of any one of the plurality of assets based on movement of the asset into or out of any of the plurality of distributed sites.

4. The system of claim 1, further comprising notification software associated with the central processor, the notification software configured to transmit a notification message to a user based on movement of an asset.

5. The system of claim 4, wherein the notification software is configured to prompt the user to confirm that the movement of the asset is authorized.

6. The system of claim 4, wherein the notification message comprises information regarding transport of the asset to the user, wherein the notification software is further configured to prompt the user to confirm receipt of the asset.

7. The system of claim 1, wherein the at least one tag reader is an RFID portal.

8. The system of claim 1, wherein the at least one tag reader comprises an automatic alarm component, wherein the at least one tag reader is configured to trigger the automatic alarm component based on any unauthorized movement of any one of the plurality of assets.

9. The system of claim 1, wherein each of the asset tags are configured to communicate with the tag reader wirelessly.

10. The system of claim 1, further comprising a client processor in communication with the central processor through the computer network, wherein the client processor is configured to allow the user to input, query, and download asset information from the central processor.

11. A system for managing a plurality of assets of a plurality of distributed sites of an enterprise and allowing a user to access asset information, the system comprising:
    (a) a central processor accessible on a computer network;
    (b) a database for storing service provider information and asset information for the plurality of assets, the database being in communication with the central processor, wherein the asset information comprises at least information relating to location, ownership, maintenance and repair of the plurality of assets;
    (c) at least one tag reader in communication with the central processor, wherein each of the at least one tag readers is associated with one of the plurality of distributed sites;
    (d) an asset tag associated with each of the plurality of assets, each asset tag comprising at least a unique asset identification for an asset with which the asset tag is associated, the asset tag configured to communicate with the tag reader; and
    (e) a user tag associated with each of a plurality of users, wherein the plurality of users comprise at least one service provider, each user tag comprising at least a unique identification for a user with which the user tag is associated, the user tag configured to communicate with the tag reader;
    (f) asset tracking software associated with the central processor, the asset tracking software configured to track a location of each of the plurality of assets; and
    (g) user tracking software associated with the central processor, the user tracking software configured to track a location of each of the plurality of users.

12. The system of claim 11, wherein the user tracking software is configured to track movement of any of the plurality of users into or out of any of the plurality of distributed sites based on information collected by the at least one tag reader from the user tag of any user.

13. The system of claim 12, wherein the user is a service provider, and further wherein the user tracking software is further configured to confirm the entrance or exit of the service provider at any one of the plurality of distributed sites.

14. The system of claim 13, wherein the user tracking software is further configured to confirm that the service provider is authorized to enter any particular one of the plurality of distributed sites.

15. The system of claim 13, further comprising access software configured to allow the service provider access to the system via a client computer or kiosk based on the information communicated to the tag reader from the user tag of the service provider.

16. The system of claim 11, further comprising notification software associated with the central processor, the notification software configured to transmit a notification message to a user based on movement of an asset.

17. The system of claim 11, wherein each of the asset tags are configured to communicate with the tag reader wirelessly.

18. The system of claim 11, further comprising a client processor in communication with the central processor through the computer network, wherein the client processor is configured to allow the user to input, query, and download asset information from the central processor.

19. The system of claim 18, wherein the client processor is a kiosk.

20. A system for managing a plurality of assets and allowing a user to access asset information, the system comprising:
(a) a central processor accessible on a computer network;
(b) a database for storing service provider information and asset information for the plurality of assets, the database being in communication with the central processor, wherein the asset information comprises at least information relating to location, ownership, maintenance and repair of the plurality of assets;
(c) at least one tag reader in communication with the central processor, wherein each of the at least one tag readers is associated with one of a plurality of distributed sites;
(d) an asset tag associated with each of the plurality of assets, each asset tag comprising at least a unique asset identification for an asset with which the asset tag is associated, the asset tag configured to communicate wirelessly with the tag reader;
(e) a user tag associated with each of a plurality of users, wherein the plurality of users comprise at least one service provider, each user tag comprising at least a unique identification for a user with which the user tag is associated, the user tag configured to communicate wirelessly with the tag reader;
(f) a client processor in communication with the central processor through the computer network, wherein the client processor is configured to allow the user to input, query, and download asset information from the central processor;
(g) asset tracking software associated with the central processor, the asset tracking software configured to track a location of each of the plurality of assets;
(h) user tracking software associated with the central processor, the user tracking software configured to track a location of each of the plurality of users; and
(i) notification software associated with the central processor, the notification software configured to transmit a notification message to a user based on movement of an asset.

* * * * *